US011288303B2

(12) United States Patent
Yang et al.

(10) Patent No.: US 11,288,303 B2
(45) Date of Patent: Mar. 29, 2022

(54) INFORMATION SEARCH METHOD AND APPARATUS

(71) Applicant: TENCENT TECHNOLOGY (SHENZHEN) COMPANY LIMITED, Shenzhen (CN)

(72) Inventors: Guangyu Yang, Shenzhen (CN); Kai Xie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 262 days.

(21) Appl. No.: 16/299,583

(22) Filed: Mar. 12, 2019

(65) Prior Publication Data

US 2019/0213209 A1 Jul. 11, 2019

Related U.S. Application Data

(63) Continuation of application No. PCT/CN2017/107811, filed on Oct. 26, 2017.

(30) Foreign Application Priority Data

Oct. 31, 2016 (CN) ........................ 201610933651.5

(51) Int. Cl.
*G06F 16/00* (2019.01)
*G06F 16/432* (2019.01)
(Continued)

(52) U.S. Cl.
CPC .......... *G06F 16/433* (2019.01); *G06F 16/438* (2019.01); *G06F 16/48* (2019.01);
(Continued)

(58) Field of Classification Search
CPC ...... G06F 16/48; G06F 16/433; G06F 16/438; G06F 16/435; G06F 16/437; G06F 16/583; G06F 16/9535
(Continued)

(56) References Cited

U.S. PATENT DOCUMENTS 8,838,434 B1 * 9/2014 Liu ........................ G06F 40/58 704/2
8,868,409 B1 * 10/2014 Mengibar .............. G06F 40/30 704/9
(Continued)

FOREIGN PATENT DOCUMENTS

CN 102841772 A 12/2012
CN 103634688 A 3/2014
(Continued)

OTHER PUBLICATIONS

The World Intellectual Property Organization (WIPO) International Search Report for PCT/CN2017/107811 dated Jan. 31, 2018 5 Pages (including translation).
(Continued)

*Primary Examiner* — Ashish Thomas
*Assistant Examiner* — Rezwanul Mahmood
(74) *Attorney, Agent, or Firm* — Anova Law Group, PLLC

(57) ABSTRACT

This application discloses an information search method and apparatus. The method includes the steps of receiving a voice message from a first terminal, the voice message including a first request, and the first request requesting a search operation; parsing out a search keyword of the first request from the voice message; and performing the search operation by using the search keyword to obtain a search result. The method further includes sending the search result to a second terminal, the first terminal being associated with
(Continued)

TV
Server
Network platform
Mobile phone
S401: Bind a TV to a public account, and trigger a voice search button to initiate a second request
S402: A sever sends a notification for inputting a voice message to a network platform
S403: An official account platform sends a prompt message to an official account of a mobile phone
S404: Input a voice message by using the mobile phone, and send the voice message to the official account platform
S405: The official account platform sends the voice message to the server
S406: The server obtains a search result after parsing the voice message
S407: Returns the search result to the TV
S408: The TV presents the search result the second terminal, and the second terminal being configured to present the search result.

15 Claims, 6 Drawing Sheets

(51) Int. Cl.
*G06F 16/48* (2019.01)
*G06F 16/438* (2019.01)
*H04N 21/41* (2011.01)
*H04N 21/422* (2011.01)
*H04N 21/472* (2011.01)

(52) U.S. Cl.
CPC ... *H04N 21/4126* (2013.01); *H04N 21/42203* (2013.01); *H04N 21/472* (2013.01)

(58) Field of Classification Search
USPC .......................................................... 707/722
See application file for complete search history.

(56) References Cited

U.S. PATENT DOCUMENTS 8,966,513 B2* 2/2015 John .................. H04N 21/4788 725/10
9,100,694 B1* 8/2015 Chandel ............... H04N 21/443
9,565,179 B2* 2/2017 Zou ....................... H04L 63/083
9,652,451 B2* 5/2017 Elder ...................... G06F 40/30
9,882,885 B2* 1/2018 Ren ......................... H04L 63/08
10,114,802 B2* 10/2018 Huang ................ G06F 3/04817
10,200,362 B2* 2/2019 Zhang ..................... G06F 21/36
10,354,307 B2* 7/2019 Ye ...................... H04N 21/4394
10,403,272 B1* 9/2019 Fanty ...................... G10L 15/22
10,432,698 B2* 10/2019 Zhang ................. G06F 16/9562
10,580,092 B2* 3/2020 Xie .......................... H04W 4/02
10,789,614 B2* 9/2020 Zhou .................. G06F 16/9535
10,856,035 B2* 12/2020 Li .................... H04N 21/44222
10,878,413 B2* 12/2020 Liu .................... G06Q 20/3829
10,896,410 B2* 1/2021 Xu ..................... G06Q 20/4014
2005/0114132 A1* 5/2005 Hsu ........................ G06F 3/167 704/251
2008/0162471 A1* 7/2008 Bernard .................. G06F 40/30
2011/0099263 A1* 4/2011 Patil ................... H04N 21/4532 709/224
2011/0197224 A1* 8/2011 Meijer ................... H04H 60/46 725/34
2013/0093897 A1* 4/2013 Fan .................. H04N 21/25891 348/159
2013/0104206 A1* 4/2013 Waghmare ........ H04M 15/7655 726/6
2013/0139196 A1* 5/2013 Sokolov ........... H04N 21/25833 725/25
2013/0191869 A1* 7/2013 Sugiyama .............. G06Q 50/01 725/42
2014/0041005 A1* 2/2014 He .......................... H04L 63/08 726/7
2014/0053195 A1* 2/2014 Sirpal .............. H04N 21/23109 725/40
2014/0082703 A1* 3/2014 Zhang ..................... H04L 63/10 726/4
2014/0101452 A1* 4/2014 Wang ...................... H04L 51/04 713/171
2014/0122059 A1* 5/2014 Patel ....................... G06F 16/40 704/9
2014/0173019 A1* 6/2014 Weng ........................ G06F 3/14 709/213
2014/0201122 A1* 7/2014 Park ................... H04N 21/4667 706/46
2014/0244429 A1* 8/2014 Clayton ............. G06Q 30/0631 705/26.7
2014/0244447 A1* 8/2014 Kim ................... G06Q 30/0643 705/27.2
2014/0244488 A1* 8/2014 Kim ....................... G06Q 20/02 705/39
2014/0253319 A1* 9/2014 Chang ............... H04M 1/72454 340/521
2014/0282744 A1* 9/2014 Hardy .................. H04N 21/482 725/61
2015/0072653 A1* 3/2015 Fan ..................... H04L 12/2807 455/411
2015/0120845 A1* 4/2015 McClard ................. H04L 51/24 709/206
2015/0143216 A1* 5/2015 Huang .................. G06F 40/134 715/208
2015/0287069 A1* 10/2015 Gissara ............... G06F 16/9535 705/14.31
2015/0287410 A1* 10/2015 Mengibar ............... G10L 17/00 704/246
2015/0304301 A1* 10/2015 Ren ....................... H04W 12/06 726/7
2015/0382047 A1* 12/2015 Van Os ................... G10L 17/22 725/38
2016/0007083 A1* 1/2016 Gurha .................. H04N 21/252 725/13
2016/0012465 A1* 1/2016 Sharp ................... G06Q 20/386 705/14.17
2016/0140122 A1* 5/2016 Harrison ............ H04N 21/4147 707/770
2016/0191434 A1* 6/2016 Rice ................... G06K 9/00228 709/204
2016/0294958 A1* 10/2016 Zhang .................. G01C 21/005
2016/0358221 A1* 12/2016 Khare ................ G06Q 30/0269
2016/0359957 A1* 12/2016 Laliberte ............ G06Q 30/0241
2017/0034176 A1* 2/2017 Qi ........................... H04L 29/08
2017/0236513 A1* 8/2017 Choudhury ............. G06F 3/167 704/244
2017/0289608 A1* 10/2017 Li ...................... H04N 21/4751
2017/0300914 A1* 10/2017 Li ...................... G06Q 20/3276
2017/0311039 A1* 10/2017 Zuo .................... H04N 21/4722
2018/0350359 A1* 12/2018 Bakar ..................... G10L 15/22
2019/0110105 A1* 4/2019 Chen .................. H04N 21/4788
2019/0213209 A1* 7/2019 Yang ..................... G06F 16/438
2019/0246162 A1* 8/2019 Yang .................. H04N 21/4781
2020/0379721 A1* 12/2020 Liao ...................... G06F 3/0482
2021/0067632 A1* 3/2021 Dai ......................... G06T 13/40
2021/0073809 A1* 3/2021 Liu .................. G06K 19/06112

FOREIGN PATENT DOCUMENTS

CN 103647996 A 3/2014
CN 103648051 A 3/2014
CN 103648054 A 3/2014
CN 104618780 A 5/2015
CN 105704521 A 6/2016

OTHER PUBLICATIONS

The State Intellectual Property Office of the People's Republic of China (SIPO) Office Action 1 for 201610933651.5 dated Jun. 20, 2018 12 Pages (including translation).

* cited by examiner

| Keyword | Deer cutter knift | Search |
| --- | --- | --- |

Search result:

Deer cutter knife (weapon in The Eleventh Son novels by Gu Long)

TV series The Eleventh Son

Movie The Eleventh Son

FIG. 6

| Keyword | What is a weapon named as the deer cutter knife in a TV series | Search |
| --- | --- | --- |

Search result:

Deer cutter knife (a weapon in a TV series The Eleventh Son series adapted according to novels of Gu Long)

TV series The Eleventh Son

FIG. 7

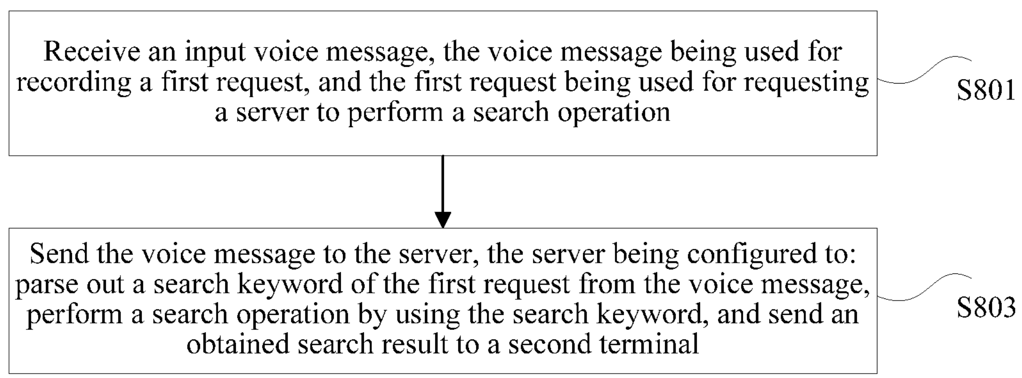

FIG. 8

INFORMATION SEARCH METHOD AND APPARATUS

RELATED APPLICATIONS

This application claims priority of PCT Application No. PCT/CN2017/107811, filed on Oct. 26, 2017, which in turn claims priority of Chinese Patent Application No. 2016109336515, entitled "Information Search Method and Apparatus," filed on Oct. 31, 2016. The two priority applications are both incorporated into the present application by reference in their entirety.

FIELD OF TECHNOLOGY

This application relates to the field of information processing, and specifically, to an information search method and apparatus.

BACKGROUND OF THE DISCLOSURE

In related technology, a television (TV) or a TV set-top box often only supports remote control or button control. Further, when a user searches for a video, a full title of the video or initials of the title of the video need to be entered. A user often needs to perform complex operations on a remote control or buttons to input the foregoing information. For example, after entering a search page, the user needs to select a letter on a virtual keyboard on the TV or the TV set-top box by using a remote control to input a search keyword. In some cases, the user needs to input a plurality of letters to complete the input of the keyword. To input each letter, one or more operations (for example, a line feed operation) often need to be performed to select a target letter. If the user inputs incorrectly during an input process, the incorrect letter and letters entered after the incorrect letter need to be deleted, and correct information may be entered again to complete the input of the keyword. Such user operations are complex and inefficient.

Embodiments of the present disclosure improve the user experience related to the foregoing problems in entering search keywords when performing searches on the TV or the TV set-top box.

SUMMARY

Embodiments of this application provide an information search method and apparatus, to improve user experience and efficiency in inputting a search keyword when information is searched on a TV or a TV box.

According to one aspect of the embodiments of this application, an information search method applied on a server is provided. The method includes the steps of receiving a voice message from a first terminal, the voice message including a first request, and the first request requesting a search operation; parsing out a search keyword of the first request from the voice message; and performing the search operation by using the search keyword to obtain a search result. The method further includes sending the search result to a second terminal, the first terminal being associated with the second terminal, and the second terminal being configured to present the search result.

According to another aspect of the embodiments of this application, an information search method is provided. The method implemented on a first terminal and a second terminal. The method includes receiving, by the first terminal, an input voice message, the voice message including a first request, and the first request requesting a server to perform a search operation. The method further includes sending, by the first terminal, the voice message to the server. The server is configured to: parse out a search keyword of the first request from the voice message, perform a search operation by using the search keyword, and send an obtained search result to a second terminal. An association is established between the first terminal and the second terminal. Further, the method includes: receiving, by the second terminal, a search result sent by a server, the search result being a result obtained after the server receiving a voice message sent by the first terminal, the voice message including a first request, and the first request requesting a search operation. The second terminal is configured to present the search result.

According to another aspect of the embodiments of this application, an information search apparatus is provided. The apparatus may be implemented on a server and include: a memory and a processor coupled to the memory. The processor is configured to: receive, before the voice message sent by the first terminal is received, a second request sent by the second terminal, the second request requesting to initiate the first request by using the voice message; and send a prompt message to the first terminal in response to the second request, the prompt message prompting to input the voice message by using the first terminal.

According to another aspect of the embodiments of this application, a non-transitory computer-readable storage medium storing computer program instructions is provided. The computer program instructions cause the at least one processor to perform: receiving a voice message from a first terminal, the voice message including a first request, and the first request requesting a search operation; parsing out a search keyword of the first request from the voice message; and performing the search operation by using the search keyword to obtain a search result. The computer program instructions also cause the at least one processor to perform sending the search result to a second terminal, the first terminal being associated with the second terminal, and the second terminal being configured to present the search result.

BRIEF DESCRIPTION OF THE DRAWINGS

The accompanying drawings described herein are used to provide further understanding of this application, and form part of this application. Exemplary embodiments of this application and descriptions thereof are used to explain this application, and do not constitute any inappropriate limitation to this application. In the accompanying drawings:

FIG. 6 is a schematic diagram of an optional information search interface according to an embodiment of this application;

FIG. 7 is a schematic diagram of an optional information search interface according to an embodiment of this application;

FIG. 8 is a flowchart of an optional information search method according to an embodiment of this application;

DESCRIPTION OF EMBODIMENTS

To make a person skilled in the art understand the solutions in this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be noted that in the specification, claims, and accompanying drawings of this application, the terms "first", "second", and so on are intended to distinguish between similar objects rather than describe a specific order. It should be understood that data used herein may be exchanged in proper situations, so that the embodiments of this application described herein may be implemented in an order other than the orders shown or described herein. Moreover, the terms "include", "contain" and any other variants mean to cover the non-exclusive inclusion, for example, a process, method, system, product, or device that includes a list of steps or units is not necessarily limited to those steps or units expressly listed, but may include other steps or units not expressly listed or inherent to such a process, method, system, product, or device.

Figure 1:
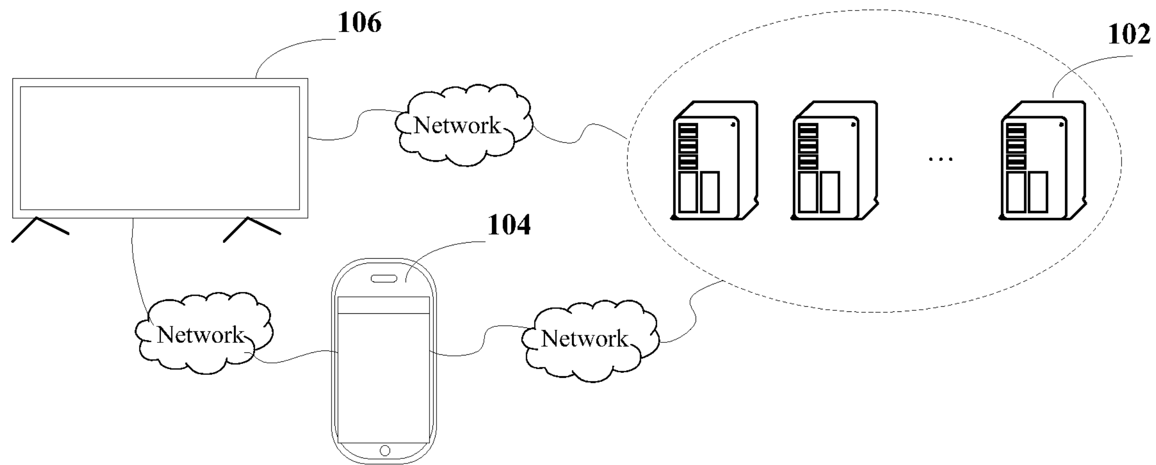
FIG. 1 is a schematic diagram of a hardware environment of an information search method according to an embodiment of this application.

According to the embodiments of this application, an embodiment of an information search method is provided. In one embodiment, the information search method and apparatus may be applied to a hardware environment shown in FIG. 1 including a server 102, a first terminal 104, and a second terminal 106. As shown in FIG. 1, the server 102 is connected to the first terminal 104 and the second terminal 106 by a network. The network includes but is not limited to: a wide area network, a metropolitan area network, or a local area network. The first terminal 104 may be terminal having a voice input and/or voice processing apparatus, for example, a personal computer (PC), a mobile phone, a tablet. In some embodiments, the second terminal may be a terminal such as a TV, a TV box, or a terminal having a video player. The information search method of this embodiment of this application may be performed by the server 102, or may be performed by the terminal 104, or may be jointly performed by the server 102, the first terminal 104, and the second terminal 106. The information search method of this embodiment of this application performed by the first terminal 104 and the second terminal 106 may be alternatively performed by clients installed on the first terminal 104 and the second terminal 106.

In some embodiments, information in the foregoing embodiment may be multimedia information, and the multimedia information may be a combination of various types of information. The information usually may include text, audio, images, and other forms. In a computer system, the multimedia information may be human-computer interaction information exchange and transmission media that combines two or more media. The multimedia information may include words, images, animations, photographs, audio, movies, and an interaction function provided by a program. In this application, an example of video information is usually used to describe the embodiments of this application in detail, but the video information is not intended to limit the solution of this application.

In some embodiments, the first terminal may be a mobile terminal having a voice input apparatus, for example, a mobile phone, a PC, or a remote control.

In some embodiments, the second terminal may be a terminal having an information present apparatus, for example, a smart TV terminal such as a TV or TV box on which a communication module and/or an operating system is installed).

In some embodiments, in a network structure shown in FIG. 1, the server may be an information processing server, and the information processing server may be configured to provide the multimedia information, for example, when receiving a search request of a terminal (for example, the first terminal and/or the second terminal), provide information requested by the search request to terminal.

In this embodiment, the server may receive a voice message sent by the first terminal, and the voice message requests the server to execute a search request. The server may perform a search operation after receiving the search request sent by the first terminal, and send a result obtained by means of performing the search operation to the second terminal. The second terminal may display search request information that is already processed by the server.

In some embodiments, the server may receive a voice message sent by the first terminal, the voice message is used for recording a first request, and the first request is used for requesting to perform a search operation. The server parses out a search keyword of the first request from the voice message, and performs a search operation by using the search keyword, to obtain a search result. The server sends the search result to the second terminal associated with the first terminal. The second terminal presents the received search result on a corresponding screen.

When the second terminal is a TV, the search result is presented on a screen of the TV; and when the second terminal is a TV box, the search result is presented on a screen connected to the TV box.

In the foregoing embodiment of this application, the second terminal may establish the association with the first terminal in advance. For example, the first terminal is bound to the second terminal. The second terminal may provide an association identifier (for example, a two-dimensional barcode) on a display interface. The first terminal returns an acknowledgement instruction to the second terminal after receiving input terminal identifier information and after receiving the acknowledgement instruction.

When the association identifier is the two-dimensional barcode, the first terminal may input the association identifier by means of scanning. In some embodiments, an interacting application or the application platform may be installed on the first terminal, and an account (also referred to as an interacting application account such as a social media account or an instant messaging account) of the interaction application is logged into on the first terminal. A video playback application may be installed on the second terminal, and an account (also referred to as an application account) of the video playback application is logged into on the second terminal. The first terminal on which the account of the interaction application is logged into may scan the two-dimensional barcode by using the interaction application, to obtain the association identifier of the second terminal, and generate an acknowledgement instruction to establish a binding relationship. The association identifier may record the account of the video playback application that is logged into on the second terminal.

Figure 2:
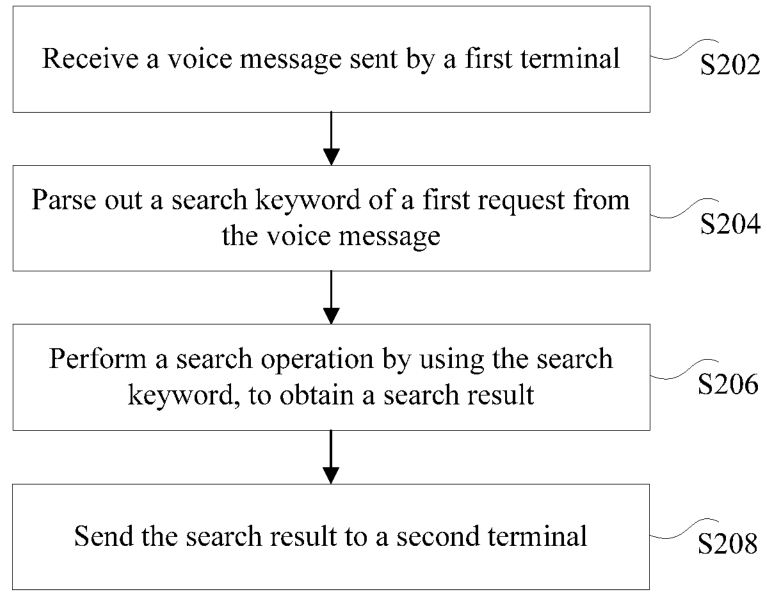
FIG. 2 is a flowchart of an optional information search method according to an embodiment of this application.

FIG. 2 is a flowchart of an optional information search method according to an embodiment of this application. The method is implemented by a server, and as shown in FIG. 2, the method may include the following steps.

Step S202: The server receives a voice message sent by a first terminal, the voice message being used for recording a first request, and the first request being used for requesting to perform a search operation.

Step S204: The server parses out a search keyword of the first request from the voice message.

Step S206: The server performs a search operation by using the search keyword, to obtain a search result.

Step S208: The server sends the search result to a second terminal, the first terminal being associated with the second terminal, and the second terminal being configured to present the search result.

According to the foregoing embodiment, a server may parse out a search keyword of a first request from a voice message after receiving the voice message sent by a first terminal, perform a search operation by using the search keyword, to obtain a search result, and send the search result to a second terminal having an association with the first terminal. The second terminal may present the search result. In this solution, voice search control on the second terminal may be implemented by using a first terminal having a voice processing apparatus, and a voice input speed or an error correction speed is faster than a speed of inputting information by means of operating a virtual keyboard. In addition, in this solution, analysis processing for the voice message is completed on the server, and a processing speed of the server is fast. Therefore, the technical problem in the existing technology of the low efficiency of inputting a search keyword when conducting keyword searches is resolved, and the search keyword may be rapidly input by using a voice.

In some embodiments, in this solution, the voice search control on the second terminal may be implemented by using the first terminal having the voice processing apparatus. The second terminal (for example, a TV) may not need to be provided with a voice processing apparatus, and the voice control on the second terminal may be implemented by using the first terminal (for example, a mobile phone). As such, a user may implement the voice control without changing a mobile model, and costs of the voice control are greatly reduced. For example, costs of changing a device by the user may be avoided. In addition, problems of the low efficiency of inputting the keyword when the voice message is processed on the TV and of a low processing speed of the TV may be avoided.

In the technical solution provided in the step S202, the server may receive the voice message sent by the first terminal. In some embodiments, the user may input the voice message by using a voice input apparatus of the first terminal, the voice message records the first request, and the first request is used for requesting the server to perform the search operation. For example, the voice message may be "searching for the movie A Single Man".

The first terminal sends the voice message to the server after receiving the voice message input by the user by using an interacting user application account logged into on the first terminal. Information transmission between the server and the first terminal may be implemented by using a wireless network. In one embodiment, the first terminal may record and store the voice message sent by the user. The server in this embodiment may be a server that provides multimedia information.

In some embodiments, the first terminal may send the voice message to the server by using a network platform of the interacting application account logged into on the first terminal. In some embodiments, the first terminal sends the voice message to a server corresponding to the network platform, and the network platform sends the voice message to a server indicated by the voice message.

The first request in the foregoing embodiment may include a search message sent by the user, the search message may include a search keyword and a search key sentence, and the search keyword may be information such as a number and/or text. The search keyword may be a letter or a word that can maximize information content that is searched by the user during search. For example, if the user desires to watch a movie, the search message may include a title of the movie, one or more names of actors in the movie, a theme song of the movie, and the like.

In the technical solution provided in the step S204, the server may parse out the search keyword of the first request in the voice message after receiving the voice message sent by the first terminal. In some embodiments, the server may parse out text information, number information, and character information in a voice by using a voice recognition system, a voice parsing system, or parsing software. The text information may include at least one of a sentence, a word, or a paragraph. After the information in the voice is parsed out, the search keyword may be extracted from the parsed-out information.

In some embodiments, after parsing the voice message, the server may extract the search keyword after removing noise in the parsed-out information.

In the technical solution provided in the step S206, the server may perform a search operation by using the search keyword after parsing out the search keyword of the first request in the voice message, to obtain the search result. In this embodiment, the search operation may be performed by means of invoking a search engine, to obtain the corresponding search result. For example, the search result corresponding to the keyword is found by using the Baidu search engine. The search result may include a name or names and/or content of one or more pieces of multimedia information. The search result may be returned in a form of a list. This is not limited in this application.

In the technical solution provided in the step S208, the server sends the search result to the second terminal after obtaining the search result, and the second terminal may be configured to present the search result found by the server. The first terminal and the second terminal may be associated, and the association may be established in advance. When the association between the first terminal and the second terminal is established, the second terminal may send a request message for establishing an association with the first terminal. After receiving the request message, the first terminal inputs corresponding information (for example, an acknowledgement instruction generated by means of tapping an acknowledgement button) by using an input box provided on an interface of the second terminal. The first terminal and the second terminal may be associated after the second terminal receives the acknowledgement instruction.

In one embodiment, the second terminal may provide an association identifier on a corresponding screen. The first terminal generates the acknowledgement instruction after inputting the association identifier, and returns the acknowledgement instruction to the second terminal, and the first terminal establishes a binding relationship with the second terminal. For example, the second terminal displays a two-dimensional barcode that may be scanned on the screen, and the first terminal inputs, by means of scanning, an association identifier represented by the two-dimensional barcode. Prompt information of "whether to bind" is displayed on a screen of the first terminal after the first terminal receives the input association identifier. The first terminal receives operation information that an acknowledgement button based on the prompt information is tapped, and generates an acknowledgement instruction, to establish the association with the second terminal.

In another optional embodiment, the second terminal provides an association account (for example, a public account, that is, an account that is applied for on an instant messaging application by a developer, a user group, a merchant, or the like and that may be followed by other users, and through which information such as text, images, voices, and videos may be presented on an instant messaging platform to other accounts or users that follow the account) which may be joined by the first terminal. In one example, a public account may be the social media account of a TV channel. The public account may contain the data of or be linked to a database of TV programs or movies provided by the TV channel. The association account may be a correspondence account through which one or more first terminals establish contact with the second terminal. The first terminal joins the association account by means of inputting corresponding information, to establish the association with the second terminal.

In some embodiments, the search result obtained from the server is displayed on the screen of the second terminal. The search result herein may include one or more pieces of description information of a movie, for example, poster information (In some embodiments, the poster information may be thumbnail information of a post) of the movie, text description information, and may further include a type and comment information (for example, a score of 4.2) of the movie.

According to the foregoing embodiment of this application, before the voice message sent by the first terminal is received, a second request sent by the second terminal is received, the second request being used for requesting to initiate the first request by using the voice message, so that a prompt message may be sent to the first terminal in response to the second request. The prompt message is used for prompting to input the voice message by using the first terminal.

In the foregoing embodiment, the server receives the second request sent by the second terminal, and the second request may be a request for requesting to input the search keyword by using a voice. The server sends the prompt message to the first terminal after receiving the request, and the prompt message may be forwarded by using the network platform of the interacting application account (the first terminal is bound to the second terminal by using the account) logged into on the first terminal.

In this embodiment, after starting, a video application of the second terminal may display a voice search button on the screen. For example, the voice search button is displayed on a main interface of the video application or a search interface of the video application, and the second request is generated by means of tapping the voice search button.

In some embodiments, the second terminal may have a remote control apparatus or first terminal adapted to the second terminal. The user may perform a corresponding operation by means of operating the remote control apparatus. For example, the user selects the information displayed on the screen of the second terminal by using the remote control apparatus, and taps a playback confirmation button in a detailed description page of the displayed information, to generate a playback request. The playback request is sent to the second terminal.

In this embodiment, the second terminal may receive operation information of a remote control by using infrared rays. The remote control may perform the tap operation at a distance. Also In some embodiments, the second terminal may perform the tap operation by means of receiving an operation instruction from another terminal (for example, the first terminal) by using Bluetooth or another wireless network.

In some embodiments, the sending a prompt message to the first terminal includes: obtaining an application account associated with the second terminal, the application account being logged into on the first terminal; and sending the prompt message to the application account by using a network platform of the application account.

In some embodiments, the server may obtain an application account (that is, the interacting application account in the foregoing embodiment) bound to the second terminal, and send the prompt message to the first terminal by using a network platform of the application account. In some embodiments, the server may send a notification to the network platform, and the network platform sends the prompt message to the application account after receiving the notification.

In one embodiment, after the receiving a second request sent by the second terminal, the method further includes: detecting whether there is an application account associated with the second terminal; and sending an association instruction to the second terminal if there is no application account associated with the second terminal, the association instruction being used for instructing the second terminal to present an association identifier so that the second terminal receives acknowledgement information returned by the first terminal based on the association identifier, to establish the association between the first terminal and the second terminal.

In some embodiments, the association identifier includes a two-dimensional barcode. In the foregoing embodiment, after the server receives the second request sent by the second terminal, the serve detects whether an application account associated with the second terminal is recorded; and if there is not the application account, determines that the second terminal is not bound to an application account, and reminds the second terminal to be bound to at least one application account, so as to input the voice message by using the terminal on which the application account is logged into; or if detecting that there is an application account associated with the second terminal, directly informs the network platform of the application account, and sends the prompt message to the first terminal on which the application account is logged into, to enable the first terminal obtain the voice message.

In some embodiments, the server sends the association instruction to the second terminal if there is no application associated with the second terminal, to inform the second terminal to be bound to at least one application account. The second terminal presents the association identifier on the screen corresponding to the second terminal after receiving the association instruction. The first terminal may input the association identifier by using the application account. The first terminal returns acknowledgement information after inputting the association identifier, to establish the association between the first terminal and the second terminal.

In some embodiments, the association identifier may be a two-dimensional barcode, and the association identifier may include identifier information of the second terminal and information of an account of a video playback terminal that is logged into on the second terminal. For example, the second terminal may present the two-dimensional barcode on the corresponding screen. The first terminal turns a camera on by using the application account, and scans and inputs the two-dimensional barcode. Prompt information of "whether to bind" is displayed on the screen of the first terminal after the first terminal receives the input two-dimensional barcode. The first terminal receives operation information (for example, the user taps an acknowledgement button on a touchscreen of the first terminal) that the acknowledgement button based on the prompt information is tapped, and generates acknowledgement information. The first terminal sends the acknowledgement information to the second terminal, to establish the association with the second terminal. Also In some embodiments, an information input interface may be displayed on the screen of the second terminal, the information input interface may record an information input box, and terminal information of the first terminal may be input by using the information input box. In some embodiments, the terminal information of the first terminal may be input into the second terminal by means of scanning.

In some embodiments, that the first terminal sends the acknowledgement information to the second terminal may alternatively be implemented by using the network platform of the application account and a server of an account logged into on the second terminal. In this process, the server may record binding information.

According to the foregoing embodiment of this application, the parsing out a search keyword of the first request from the voice message include: performing semantic recognition on the voice message to obtain semantic meaning represented by the voice message; and using all or part of the recognized semantic meaning as the search keyword.

In this embodiment, the server receives the voice message sent by the first terminal, performs recognition on the voice message to obtain the semantic meaning represented by the voice message, extracts all or part of content from the semantic meaning to use as the search keyword, performs the search operation by using the search keyword after obtaining the search keyword, to obtain the search result, and sends the search result to the second terminal. The second terminal presents the received search result.

In some embodiments, the recognized semantic meaning is used as the search keyword, and fuzzy retrieval is performed by using the search keyword, to obtain the search result. For example, the parsed-out semantic meaning is "the movie A Single Man", and all of the content may be used as the search keyword. Also In some embodiments, part of the content is extracted from the recognized semantic meaning and is used as the search keyword, and fuzzy retrieval is performed by using the search keyword, to obtain the search result. For example, the parsed-out semantic meaning is "what is a deer cutter knife in a TV series", and search keywords: "TV series" and "deer cutter knife" may be extracted. The fuzzy retrieval refers to that a search system performs a fuzzy search according to a search keyword and/or a synonym of the search keyword. The synonym may be configured in advance.

In some embodiments, the performing a search operation by using the search keyword, to obtain a search result includes: searching a database for multimedia information including the search keyword, to obtain the search result, the multimedia information including a name and/or content of a multimedia resource.

Figure 3:
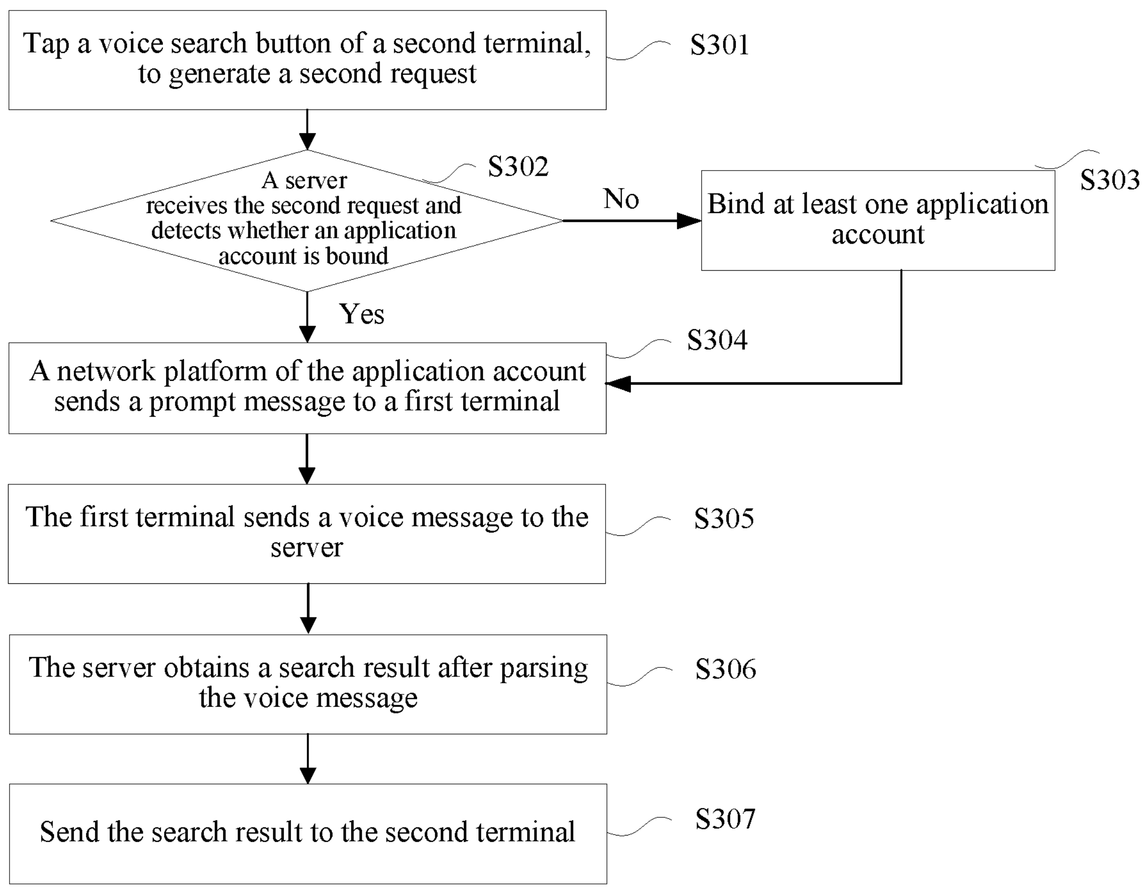
FIG. 3 is a flowchart of an optional information search method according to an embodiment of this application.

The following describes an optional embodiment of this application in detail with reference to FIG. 3. As shown in FIG. 3, this embodiment may include the following steps.

Step S301: A user may tap a voice search button of a second terminal, to generate a second request. The second terminal may be a TV end, and an implementation of this embodiment is not affected by whether a voice can be input into the TV end or whether the TV end can be controlled by a voice.

Step S302: A server receives the second request and detects whether an application account is bound. If not, step S303 is performed; if yes, step S304 is performed.

Step S303: The server binds at least one application account. In some embodiments, in this solution, a TV that does not support voice control may interact with a mobile phone, and a connection is established by means of binding a public account of an instant messaging application, to send a voice.

Step S304: A network platform of the application account sends a prompt message to a first terminal.

Step S305: The first terminal sends a voice message to the server. The voice search button is tapped first, and then whether a public account is bound is detected. If not, the first terminal is prompted to bind a public account first. Thereafter, the device (that is, the first terminal) is associated with the public account (e.g., the application account). After the association, the public account receives a prompt of "Please speak out". A movie or content that a user desires to search for is then spoken out according to the prompt message and is sent.

Step S306: The server obtains a search result after parsing the voice message.

Step S307: The server sends the search result to the second terminal.

Figure 4:
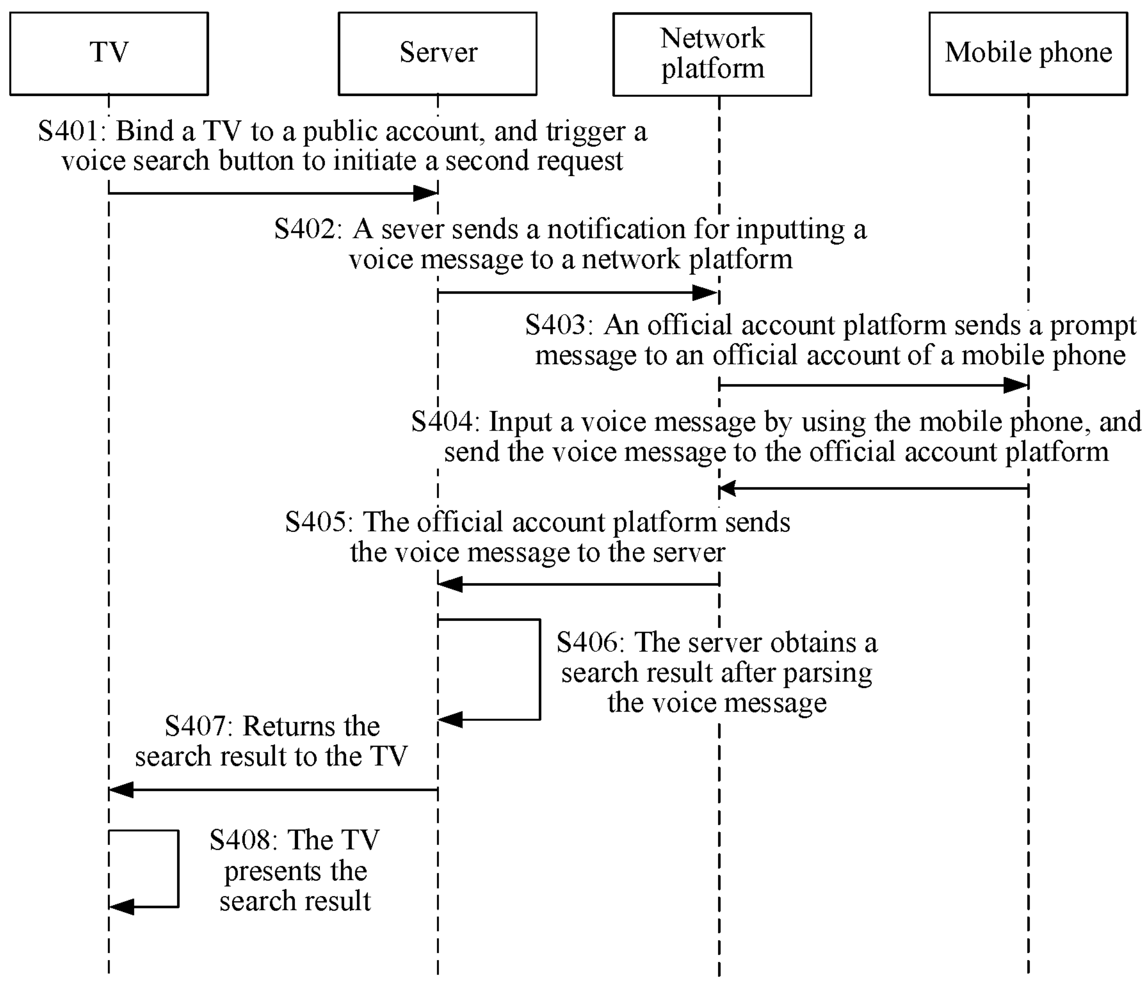
FIG. 4 is a flowchart of an optional information search method according to an embodiment of this application.

In the foregoing embodiment, after receiving the voice message, a background application performs parsing operations to search for a movie in accordance with voice content of the voice message, and returns the movie to the TV end for displaying. A customer may view or watch the movie by means of tapping. The following describes another optional embodiment of this application in detail with reference to FIG. 4. As shown in FIG. 4, in this embodiment, a first terminal is a mobile phone, a second terminal is a TV, an application account is a public account, and a network platform of the application account is a public account platform. This embodiment may include the following steps.

Step S401: Bind the TV to the public account, and trigger a voice search button to initiate a second request. In some embodiments, a trigger operation on the voice search button is the same as the implementation in the foregoing embodiment. Details are not described herein again.

In some embodiments, a connection is established between the mobile phone and the TV by means of binding the public account, so that the mobile phone can interact with the TV. If a voice function is needed, a two-dimensional barcode is scanned first to bind the public account. It should be noted that if a public account is already bound, the binding operation does not need to be performed again. That is, if the TV and the mobile phone are already bound, an operation of voice control may be directly started by using the mobile phone next time.

Step S402: The sever sends a notification for inputting a voice message to the network platform.

Step S403: The public account platform sends a prompt message to a public account of the mobile phone. When receiving that the voice search button is tapped, a background application sends a prompt message of a voice to the public account, and a voice receiving state is started.

Step S404: Input a voice message by using the mobile phone, and send the voice message to the public account platform.

Step S405: The public account platform sends the voice message to the server. In some embodiments, a user speaks out, according to a voice prompt, words about a movie title, content of a movie that cannot be remembered for a moment, an actor, or a story, and sends the words to the background.

Step S406: The server obtains a search result after parsing the voice message.

Step S407: The server returns the search result to the TV.

Step S408: The TV presents the search result.

After receiving the voice message and parsing the voice message, the background application (that is, the server) finds movies in accordance with the content by using a search engine and presents the movies, then retrieves movie titles in accordance with the requirements, and returns the movie titles to the TV end to display and present the movie titles for customer selection.

According to the foregoing embodiment, the voice control is also performed when the TV does not support the voice control, and a movie whose title is not known by the user may be found. If the user desires to search for a movie but does not know the movie title, the movie may be found by using a popular term of the movie or a sentence describing main content that is spoken out by the user, thereby facilitating the user in viewing a desired movie in real time.

Figure 5:
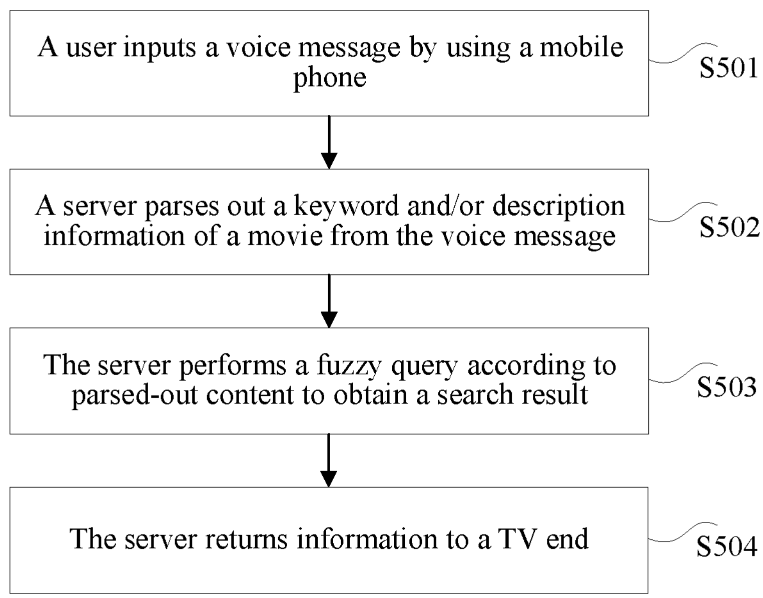
FIG. 5 is a flowchart of an optional information search method according to an embodiment of this application.

The following describes another optional embodiment of this application in detail with reference to FIG. 5 to FIG. 7. As shown in FIG. 5, in this embodiment, a first terminal is a mobile phone, a second terminal is a TV, an application account is a public account (e.g., a public account for a TV channel), and a network platform of the application account is a public account platform. This embodiment may include the following steps.

Step S501: A user inputs a voice message by using a mobile phone.

Step S502: The server parses out a keyword and/or description information of a movie from the voice message.

Step S503: The server performs a fuzzy query according to parsed-out content to obtain a search result.

Step S504: The server returns information to a TV end.

According to the foregoing solution, a search may be performed according to some popular terms in a video or a description sentence of a movie.

As shown in FIG. 6, for example, a user desires to search for The Eleventh Son, and forgets the title but knows a popular term and an actor name or a sentence in the movie. For example, "deer cutter knife" is input by using a voice, content parsed out by the server is "deer cutter knife", and the content may be directly used for a fuzzy search. Three pieces of results shown in FIG. 6 may be obtained by means of searching: "deer cutter knife (a weapon in The Eleventh Son novels by Gu Long)", "TV series The Eleventh Son", and "the movie The Eleventh Son".

As shown in FIG. 7, for example, a user desires to search for The Eleventh Son, and forgets the title but knows a popular term and an actor name or a sentence in the movie. For example, "what is a weapon named as a deer cutter knife in a TV series" is input by using a voice, content parsed out by the server is "what is a weapon named as a deer cutter knife in a TV series", and the content may be used for a fuzzy search. Two pieces of search results shown in FIG. 7 may be obtained by means of searching: "the TV series The Eleventh Son" and "deer cutter knife (a weapon in a TV series The Eleventh Son series adapted according to novels of Gu Long)".

According to the foregoing embodiment, when the user searches for a certain popular term, for example, the deer cutter knife, the background application on the server may retrieve movies corresponding to the popular term and returns the movies to the TV. Alternatively, the user may describe approximate story content of a movie, and the background application retrieves movies in accordance with the story and returns the movies to a client. The server may conduct the search in one or more databases associated with the public account, or in other databases available to the first terminal and/or the second terminal. This solution can resolve a problem that a customer needs to use voice control but a model does not support the voice control, and during use, can resolve a problem that the customer desires to watch a movie but cannot remember a title for a moment, thereby satisfying requirements of the customer.

In the foregoing embodiment, when a voice function is used on the model that does not support the voice control, a public account may be bound first in an instant messaging application. When the voice search is triggered, the server may send a message to the public account to remind the user to utter a voice, the voice is then sent to the server for parsing, and a result is returned. According to the foregoing embodiment, the search may be performed over the content of a movie. In many cases, the user may not know the movie title and may only know actors, characters, and some stories of the movie, therefore, a search engine may be added on the server, after content of a voice message is parsed out, movies corresponding to these scenarios may be found, and the found results are returned to the client for presentation. In embodiments of the present application, the customer can therefore more easily find desired video movies in time.

According to another aspect of the embodiments of this application, an information search method is further provided. The method is implemented by a first terminal, and as shown in FIG. 8, this embodiment may include:

Step S801: Receive an input voice message, the voice message being used for recording a first request, and the first request being used for requesting a server to perform a search operation.

Step S803: Send the voice message to the server, the server being configured to: parse out a search keyword of the first request from the voice message, perform a search operation by using the search keyword, and send an obtained search result to a second terminal, associate the first terminal and the second terminal, and the second terminal being configured to present the search result.

In the foregoing embodiment, after receiving the voice message sent by the first terminal, the server may parse out, by means of parsing, the search keyword of the first terminal that is recorded in the voice message and is used for requesting to perform a search operation. After parsing out the search keyword, the server may perform the search operation by using the search keyword, and obtain the search result. The server may send the obtained search result to the second terminal that can present the search result. According to this embodiment of this application, the technical problem of the low efficiency of inputting a search keyword when information is searched in a TV or a TV box is resolved, and the search keyword can be input rapidly by using the voice.

In some embodiments, before the receiving an input voice message, the method further includes: receiving a prompt message sent by the server, the prompt message being used for prompting to input the voice message by using the first terminal; and presenting the prompt message on a screen of the first terminal. In some embodiments, before the receiving a prompt message sent by the server. The method further includes: logging, on the first terminal, into an application account associated with the second terminal. The receiving a prompt message sent by the server includes: receiving the prompt message by using a network platform of the application account, the prompt message being received by the network platform from the server. In some embodiments, before the receiving an input voice message, the method further includes: obtaining identifier information presented by the second terminal; and sending acknowledgement information to the second terminal based on the identifier information, to establish the association between the first terminal and the second terminal.

Figure 9:
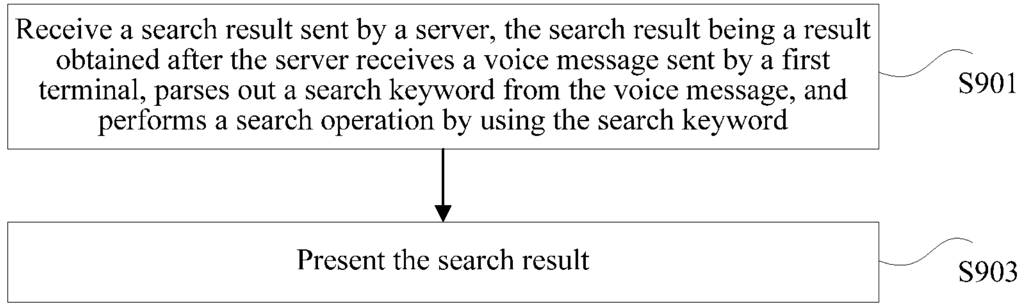
FIG. 9 is a flowchart of an optional information search method according to an embodiment of this application.

According to another aspect of the embodiments of this application, an information search method is further provided. The method is implemented on a second terminal, and as shown in FIG. 9, this embodiment may include:

Step S901: The second terminal may receive a search result sent by a server, the search result being a result obtained after the server receives a voice message sent by a first terminal, the voice message being used for recording a first request, and the first request being used for requesting to perform a search operation, parses out a search keyword of the first request from the voice message, and performs a search operation by using the search keyword.

Step S903: The second terminal may present the search result.

In some embodiments, before the receiving a search result sent by a server, the method may further include: sending a second request to the server, the second request being used for requesting to initiate the first request by using the voice message input by the first terminal. In some embodiments, before the receiving a search result sent by a server, the method further includes: presenting an association identifier; and receiving acknowledgement information returned by the first terminal based on the association identifier, to associate the first terminal and the second terminal. In some embodiments, the association identifier includes a two-dimensional barcode.

It should be noted that, to simplify the description, the foregoing method embodiments are described as a series of action combinations. However, a person skilled in the art should know that this application is not limited to any described sequence of the actions, as some steps can adopt other sequences or can be performed simultaneously according to this application. Secondarily, a person skilled in the art should know that the embodiments described in the specification all belong to exemplary embodiments and the involved actions and modules are not necessary for this application.

Through the foregoing description of the implementations, it is clear to a person skilled in the art that the method according to the embodiments may be implemented by software plus a necessary hardware platform, and certainly may also be implemented by hardware, but in many cases, the former implementation is preferred. Based on such an understanding, the technical solutions of this application essentially may be implemented in a form of a software product. The computer software product may be stored in a storage medium (for example, a ROM/RAM, a magnetic disk, or an optical disc), and includes several instructions for instructing a terminal device (which may be a mobile phone, a computer, a server, a network device, or the like) to perform the methods according to the embodiments of this application.

Figure 10:
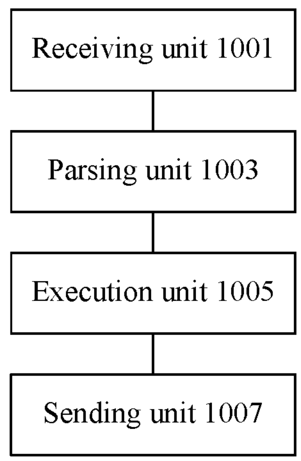
FIG. 10 is a schematic diagram of an optional information search apparatus according to an embodiment of this application.

According to an embodiment of this application, an information search apparatus for performing the information search method is further provided. FIG. 10 is a schematic diagram of an optional information search apparatus according to an embodiment of this application. As shown in FIG. 10, the apparatus may include: a receiving unit 1001, configured to receive a voice message sent by a first terminal, the voice message being used for recording a first request, and the first request being used for requesting to perform a search operation; a parsing unit 1003, configured to parse out a search keyword of the first request from the voice message; an execution unit 1005, configured to perform a search operation by using the search keyword, to obtain a search result; and a sending unit 1007, configured to send the search result to a second terminal, associate the first terminal and the second terminal, and the second terminal being configured to present the search result.

According to the foregoing embodiment, a server parses out a search keyword of a first request from a voice message after receiving the voice message sent by the first terminal, performs a search operation by using the search keyword, to obtain a search result, and sends the search result to the second terminal having an association with the first terminal. The second terminal may present the search result. In this solution, voice search control on the second terminal may be implemented by using a first terminal having a voice processing apparatus, and a voice input speed or an error correction speed is faster than a speed of inputting information by means of operating a virtual keyboard. Therefore, the technical problem in the existing technology of the low efficiency of inputting a search keyword when conducting keyword searches is resolved, and the search keyword may be rapidly input by using a voice.

In some embodiments, the apparatus may include: a first receiving module, configured to receive, before the voice message sent by the first terminal is received, a second request sent by the second terminal, the second request being used for requesting to initiate the first request by using the voice message; and a first sending module, configured to send a prompt message to the first terminal in response to the second request, the prompt message being used for prompting to input the voice message by using the first terminal.

According to the foregoing embodiment of this application, the first sending module may include: a first obtaining module, configured to obtain an application account associated with the second terminal, the application account being logged into on the first terminal; and a second sending module, configured to send the prompt message to the application account by using a network platform of the application account.

In some embodiments, the apparatus may further include: a first detection module, configured to detect, after the second request sent by the second terminal is received, whether there is an application account being associated with the second terminal; and a third sending module, configured to send an association instruction to the second terminal if there is no application account being associated with the second terminal, the association instruction being used for instructing the second terminal to present an association identifier so that the second terminal receives acknowledgement information returned by the first terminal based on the association identifier, to establish the association between the first terminal and the second terminal. The association identifier includes a two-dimensional barcode.

In one embodiment, the parsing unit may include: a recognition module, configured to perform semantic recognition on the voice message to obtain semantic meaning represented by the voice message; and a using module, configured to use all or part of the recognized semantic meaning as the search keyword.

In some embodiments, the execution unit may include: a first search module, configured to search a database for multimedia information including the search keyword, to obtain the search result, the multimedia information including a name and/or content of a multimedia resource.

Figure 11:
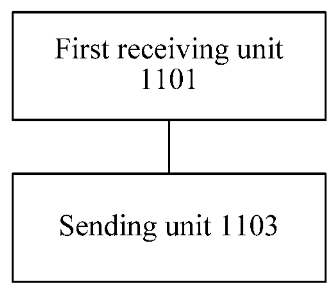
FIG. 11 is a schematic diagram of an optional information search apparatus according to an embodiment of this application.

FIG. 11 is a schematic diagram of an optional information search apparatus according to an embodiment of this application. As shown in FIG. 11, the apparatus may include: a first receiving unit 1101, configured to receive an input voice message, the voice message being used for recording a first request, and the first request being used for requesting a server to perform a search operation; and a sending unit 1103, configured to send the voice message to the server, the server being configured to: parse out a search keyword of the first request from the voice message, perform a search operation by using the search keyword, and send an obtained search result to a second terminal, associating the first terminal and the second terminal, and the second terminal being configured to present the search result.

According to the foregoing embodiment, the server parses out a search keyword of a first request from a voice message after receiving the voice message sent by the first terminal, performs a search operation by using the search keyword, to obtain a search result, and sends the search result to the second terminal having an established association with the first terminal. The second terminal may present the search result. In this solution, voice search control on the second terminal may be implemented by using a first terminal having a voice processing apparatus, and a voice input speed or an error correction speed is faster than a speed of inputting information by means of operating a virtual keyboard. Therefore, the technical problem in the existing technology of the low efficiency of inputting a search keyword when conducting keyword searches is resolved, and the search keyword may be rapidly input by using a voice.

In some embodiments, the apparatus further includes: a second receiving unit, configured to receive, before the input voice message is received, a prompt message sent by the server, the prompt message being used for prompting to input the voice message by using the first terminal; and a present unit, configured to present the prompt message on a screen of the first terminal before the input voice message is received. In some embodiments, the apparatus further includes: a login unit, configured to log, on the first terminal before the prompt message sent by the server is received, into an application account used for associating with the second terminal; and the second receiving unit is specifically configured to receive the prompt message by using a network platform of the application account, the prompt message being received by the network platform from the server.

According to the foregoing embodiment, the first receiving unit is further configured to obtain, before receiving the input voice message, identifier information presented by the second terminal. The apparatus further includes an establishment unit, configured to send acknowledgement information to the second terminal based on the identifier information before the input voice message is received, to establish the association between the first terminal and the second terminal.

An optional information search apparatus according to an embodiment of this application is provided. The apparatus is implemented on a second terminal and the apparatus may include: a receiving unit, configured to receive a search result sent by a server, the search result being a result obtained after the server receives a voice message sent by a first terminal, the voice message being used for recording a first request, and the first request being used for requesting to perform a search operation, parses out a search keyword of the first request from the voice message, and performs a search operation by using the search keyword; and a present unit, configured to present the search result.

According to the foregoing embodiment, the server parses out a search keyword of a first request from a voice message after receiving the voice message sent by the first terminal, performs a search operation by using the search keyword, to obtain a search result, and sends the search result to the second terminal having an association with the first terminal. The second terminal may present the search result. In this solution, voice search control on the second terminal may be implemented by using a first terminal having a voice processing apparatus, and a voice input speed or an error correction speed is faster than a speed of inputting information by means of operating a virtual keyboard. Therefore, the technical problem in the existing technology of the low efficiency of inputting a search keyword when conducting keyword searches is resolved, and the search keyword may be rapidly input by using a voice.

In some embodiments, the apparatus further includes: a sending unit, configured to send a second request to the server before the search result sent by the server is received, the second request being used for requesting to initiate the first request by using the voice message input by the first terminal. According to the foregoing embodiment of this application, the present unit is further configured to present an association identifier before the search result sent by the server is received; and the receiving unit is further configured to receive, before receiving the search result sent by the server, acknowledge information returned by the first terminal based on the association identifier, to establish an association between the first terminal and the second terminal. The association identifier includes a two-dimensional barcode.

It should be noted herein that an implementation example and application scenario of the foregoing modules and corresponding steps are the same, but are not limited to the content disclosed in the foregoing embodiments. It should be noted that, as a part of the apparatus, the foregoing modules may run in the hardware environment shown in FIG. 1, and may be implemented by using software, or may be implemented by using hardware. The hardware environment includes a network environment.

According to another aspect of the embodiments of this application, a storage medium (also referred to as a memory) is provided. The storage medium includes stored programs, when executed, the programs being configured to perform any one of the foregoing methods.

Figure 12:
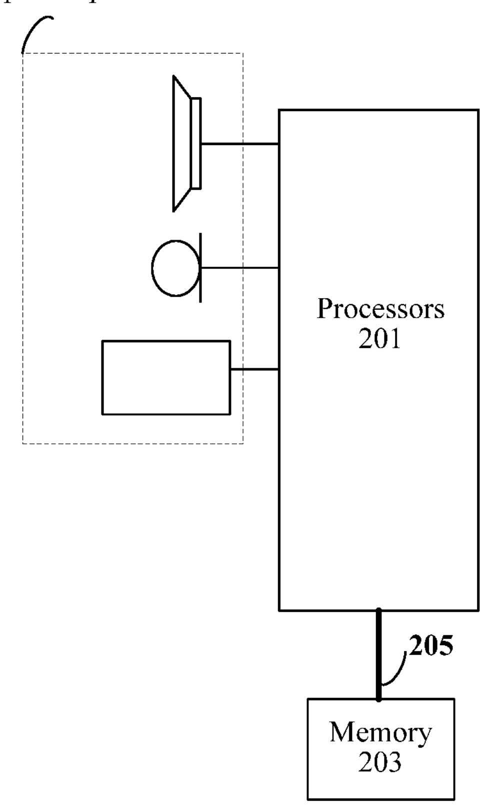
FIG. 12 is a structural block diagram of a terminal according to an embodiment of this application.

According to an embodiment of this application, a server or a terminal (or referred to as an electronic apparatus) configured to implement the foregoing information search method is further provided. FIG. 12 is a structural block diagram of a terminal according to an embodiment of this application. As shown in FIG. 12, the terminal may include: one or more (only one is shown in FIG. 12) processors 201, a memory 203, and a transmission apparatus 205 (for example, the sending apparatus in the foregoing embodiments). As shown in FIG. 12, the terminal may further include an input/output device 207.

The memory 203 may be configured to store a software program and a module, for example, a program instruction/module corresponding to the information search method and apparatus in the embodiments of this application, and the processor 201 runs the software program and the module stored in the memory 203, so as to perform various function applications and data processing, that is, implement the foregoing information search method. The memory 203 may include a high-speed random memory, and may also include a nonvolatile memory, for example, one or more magnetic storage devices, flash memories or other nonvolatile solid-state memories. In some examples, the memory 203 may further include memories remotely disposed relative to the processor 201, and these remote memories may be connected to the terminal through a network. Examples of the network include but are not limited to: the Internet, an intranet, a local area network, a mobile communications network, and a combination thereof.

The transmission apparatus 205 is configured to receive or send data through a network, and may be used for data transmission between the processor and the memory. Specific examples of the network may include a wired network and a wireless network. In an example, the transmission apparatus 205 includes a network interface controller (NIC) that may be connected to another network device and a router by using a network cable, thereby communicating with the Internet or a local area network. In an example, the transmission apparatus 205 is a radio frequency (RF) module that is configured to communicate with the Internet in a wireless manner.

In some embodiments, the memory 203 is configured to store application programs.

The processor 201 may invoke, by using the transmission apparatus 205, the application programs stored in the memory 203, to perform the following steps: receiving a voice message sent by a first terminal, the voice message being used for recording a first request, and the first request being used for requesting to perform a search operation; parsing out a search keyword of the first request from the voice message; performing a search operation by using the search keyword, to obtain a search result; and sending the search result to a second terminal, an association being established between the first terminal and the second terminal, and the second terminal being configured to present the search result.

The processor 201 may invoke, by using the transmission apparatus 205, the application programs stored in the memory 203, to perform the following steps: receiving an input voice message, the voice message being used for recording a first request, and the first request being used for requesting a server to perform a search operation; and sending the voice message to the server, the server being configured to: parse out a search keyword of the first request from the voice message, perform a search operation by using the search keyword, and send an obtained search result to a second terminal, an association being established between the first terminal and the second terminal, and the second terminal being configured to present the search result.

The processor 201 may invoke, by using the transmission apparatus 205, the application programs stored in the memory 203, to perform the following steps: receiving a search result sent by a server, the search result being a result obtained after the server receives a voice message sent by a first terminal, the voice message being used for recording a first request, and the first request being used for requesting to perform a search operation, parses out a search keyword of the first request from the voice message, and performs a search operation by using the search keyword; and presenting the search result.

For a specific example of this embodiment can be referred to the examples described in the foregoing embodiments, and details are not described herein again in this embodiment.

A person of ordinary skill in the art may understand that, the structure shown in FIG. 12 is only schematic. Alternatively, the terminal may be a terminal device such as a smartphone (such as an Android mobile phone or an iOS mobile phone), a tablet computer, a palmtop computer, a mobile Internet device (MID), or a PAD. FIG. 12 does not limit the structure of the foregoing electronic apparatus. The terminal may further include more or fewer components (such as a network interface and a display apparatus) than those shown in FIG. 12, or has a configuration different from that shown in FIG. 12.

A person of ordinary skill in the art may understand that all or a part of the steps of the methods of the foregoing embodiments may be implemented by a program instructing relevant hardware of the terminal device. The program may be stored in a computer readable storage medium. The storage medium may be a flash disk, a read-only memory (ROM), a random access memory (RAM), a magnetic disk, or an optical disc.

An embodiment of this application further provides a storage medium. In some embodiments, the storage medium may be configured to execute program code of the information search method.

In some embodiments, the storage medium may be located on at least one network device of a plurality of network devices in the network shown in the foregoing embodiments.

In some embodiments, the storage medium is configured to store program code used for executing the following steps.

Step S1: Receive a voice message sent by a first terminal, the voice message being used for recording a first request, and the first request being used for requesting to perform a search operation.

Step S2: Parse out a search keyword of the first request from the voice message.

Step S3: Perform a search operation by using the search keyword, to obtain a search result.

Step S4: Send the search result to a second terminal, an association being established between the first terminal and the second terminal, and the second terminal being configured to present the search result.

Specific example of this embodiment can be references to the examples described in the foregoing embodiments, and details are not described herein again in this embodiment.

In embodiments of this application, a server parses out a search keyword of a first request from a voice message after receiving the voice message sent by a first terminal, performs a search operation by using the search keyword to obtain a search result. The server sends the search result to a second terminal associated with the first terminal. The second terminal may present the search result. As such, voice search control on the second terminal may be implemented by using a first terminal having a voice processing apparatus. The voice input speed or an error correction speed is faster than the speed of inputting information by means of operating a virtual keyboard. Therefore, embodiments of the present application improve the efficiency of inputting a search keyword when conducting keyword searches.

In some embodiments, the storage medium may include but is not limited to: any medium that can store program code, such as a USB flash drive, a read-only memory (ROM), a random access memory (RAM), a removable hard disk, a magnetic disk, or an optical disc.

The sequence numbers of the foregoing embodiment of this application are merely for description purpose but do not indicate the preference of the embodiments.

When the integrated unit in the foregoing embodiment is implemented in a form of a software functional module or unit, the software module or unit may be computer programs stored in the foregoing computer readable storage medium. Based on such an understanding, the technical solutions of this application essentially may be implemented by one or more processors executing the software modules. The computer software modules or units may be stored in a storage medium and includes several instructions for instructing one or more computer devices (which may be a personal computer, a server, a network device, or the like) to perform all or some of the steps of the methods described in the embodiments of this application.

In the foregoing embodiments of this application, descriptions of the embodiments have different emphases, and as for parts that are not described in detail in one embodiment, reference may be made to the relevant description of the other embodiments.

In the several embodiments provided in this application, it should be understood that the disclosed terminal may be implemented in other manners. The described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic, mechanical, or other forms.

The units described in the present application may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional modules or units in the embodiments of this application may be integrated into one processing unit, or each of the units may exist alone physically, or two or more units are integrated into one unit. The functional module or unit may be implemented in a form of hardware, in a form of software functional modules and units, or may be implemented by a combination of software and hardware components.

The above descriptions are merely preferred embodiments of this application, and it should be noted that, a person of ordinary skill in the art may make various modifications and refinements without departing from the spirit of this application. All such modifications and refinements shall fall within the protection scope of this application.

What is claimed is:

1. An information search method, implemented by a server, and comprising:

receiving a voice message initiation request from a second terminal in response to a voice search button displayed on the second terminal being selected;

in response to the voice message initiation request, determining that the second terminal is associated with a user account logged into an interaction application executed on a first terminal, wherein the user account follows, in the interaction application, a public account corresponding to a TV channel on the second terminal, the public account being a social media account applied by the TV channel on the interaction application, and the public account being linked to a database containing multimedia provided by the TV channel;

sending a prompt message to the interaction application of the first terminal through the public account, the prompt message prompting the first terminal to input a voice message, the prompt message being presented on the first terminal as a message from the social media account of the TV channel to the user account;

receiving the voice message from the first terminal, the voice message including a first request, and the first request requesting a search operation;

parsing out a search keyword of the first request from the voice message;

performing the search operation by using the search keyword to obtain a search result; and sending the search result to a second terminal, the first terminal being associated with the second terminal, and the second terminal being configured to present the search result.

2. The method according to claim 1, further comprising:

determining that no user account is associated with the second terminal;

sending an association instruction to the second terminal in response to no user account being associated with the second terminal, the association instruction instructing the second terminal to present an association identifier; and establishing an association relationship between the user account of the first terminal and the second terminal in response to the first terminal using the interaction application to scan the association identifier.

3. The method according to claim 2, wherein the association identifier comprises a two-dimensional barcode.

4. The method according to claim 1, further comprising:

performing semantic recognition on the voice message to obtain semantic meaning represented by the voice message; and using the recognized semantic meaning as the search keyword.

5. The method according to claim 1, further comprising:

searching the database for multimedia information comprising the search keyword, to obtain the search result.

6. The method according to claim 2, wherein:

the second terminal is logged in with an application account of a video playback application of the TV channel;

the association identifier records the application account of the video playback application; and establishing the association relationship comprises: in response to the first terminal using the interaction application to scan the association identifier presented on the second terminal, binding the user account of the interaction application with the application account of the video playback application according to the association identifier.

7. An information search apparatus applied to a server, the apparatus comprising:

a memory; and a processor coupled to the memory and configured to:

receive a voice message initiation request from a second terminal in response to a voice search button displayed on the second terminal being selected;

in response to the voice message initiation request, determine that the second terminal is associated with a user account logged into an interaction application executed on a first terminal, wherein the user account follows, in the interaction application, a public account corresponding to a TV channel on the second terminal, the public account being a social media account applied by the TV channel on the interaction application, and the public account being linked to a database containing multimedia provided by the TV channel;

send a prompt message to the interaction application of the first terminal through the public account, the prompt message prompting the first terminal to input a voice message, the prompt message being presented on the first terminal as a message from the social media account of the TV channel to the user account;

receive the voice message from the first terminal, the voice message including a first request, and the first request requesting a search operation;

parse out a search keyword of the first request from the voice message;

perform a search operation by using the search keyword, to obtain a search result; and send the search result to a second terminal, an association being established between the first terminal and the second terminal, and the second terminal being configured to present the search result.

8. The apparatus according to claim 7, wherein the processor is further configured to:

determine, after the second request sent by the second terminal is received, no user account having an established association with the second terminal; and send an association instruction to the second terminal if there is no user account having an established association with the second terminal, the association instruction instructing the second terminal to present an association identifier; and establish an association relationship between the user account of the first terminal and the second terminal in response to the first terminal using the interaction application to scan the association identifier.

9. The apparatus according to claim 8, wherein the association identifier comprises a two-dimensional barcode.

10. The apparatus according to claim 7, wherein the processor is further configured to:

perform semantic recognition on the voice message to obtain semantic meaning represented by the voice message; and use the recognized semantic meaning as the search keyword.

11. The apparatus according to claim 7, wherein the processor is further configured to:

search a database for multimedia information comprising the search keyword, to obtain the search result.

12. A non-transitory computer-readable storage medium storing computer program instructions executable by at least one processor to perform:

receiving a voice message initiation request from a second terminal in response to a voice search button displayed on the second terminal being selected;

in response to the voice message initiation request, determining that the second terminal is associated with a user account logged into an interaction application executed on a first terminal, wherein the user account follows, in the interaction application, a public account corresponding to a TV channel on the second terminal, the public account being a social media account applied by the TV channel on the interaction application, and the public account being linked to a database containing multimedia provided by the TV channel;

sending a prompt message to the interaction application of the first terminal through the public account, the prompt message prompting the first terminal to input a voice message, the prompt message being presented on the first terminal as a message from the social media account of the TV channel to the user account;

receiving the voice message from the first terminal, the voice message including a first request, and the first request requesting a search operation;

parsing out a search keyword of the first request from the voice message;

performing the search operation by using the search keyword to obtain a search result; and sending the search result to a second terminal, the first terminal being associated with the second terminal, and the second terminal being configured to present the search result.

13. The storage medium according to claim 12, wherein the computer program instructions further cause the at least one processor to perform:

determining that no user account is associated with the second terminal;

sending an association instruction to the second terminal in response to no user account being associated with the second terminal, the association instruction instructing the second terminal to present an association identifier; and establishing an association relationship between the user account of the first terminal and the second terminal in response to the first terminal using the interaction application to scan the association identifier.

14. The storage medium according to claim 13, wherein the association identifier comprises a two-dimensional barcode.

15. The storage medium according to claim 12, wherein the computer program instructions further cause the at least one processor to perform:

performing semantic recognition on the voice message to obtain semantic meaning represented by the voice message; and using the recognized semantic meaning as the search keyword.

* * * * *